United States Patent
Dinkel et al.

(10) Patent No.: US 7,478,998 B2
(45) Date of Patent: Jan. 20, 2009

(54) CONVEYOR DEVICE

(75) Inventors: Dieter Dinkel, Schwalbach (DE); Axel Hinz, Neu-Anspach (DE); Hans-Dieter Reinartz, Frankfurt/M (DE)

(73) Assignee: Continental Teves AG & Co. oHG, Frankfurt (DE)

( * ) Notice: Subject to any disclaimer, the term of this patent is extended or adjusted under 35 U.S.C. 154(b) by 679 days.

(21) Appl. No.: 10/531,925

(22) PCT Filed: Oct. 23, 2003

(86) PCT No.: PCT/EP03/11733

§ 371 (c)(1),
(2), (4) Date: Apr. 19, 2005

(87) PCT Pub. No.: WO2004/037624

PCT Pub. Date: May 6, 2004

(65) Prior Publication Data

US 2006/0013702 A1    Jan. 19, 2006

(30) Foreign Application Priority Data

Oct. 26, 2002   (DE) ................................ 102 49 909

(51) Int. Cl.
*F04B 19/00* (2006.01)
(52) U.S. Cl. ...................................................... 417/470
(58) Field of Classification Search .................. 417/273, 417/559, 470
See application file for complete search history.

(56) References Cited

U.S. PATENT DOCUMENTS

| | | | |
|---|---|---|---|
| 2,463,486 A | | 3/1949 | Johnson |
| 6,042,350 A | * | 3/2000 | Beck ........................... 417/549 |
| 6,079,961 A | * | 6/2000 | Schuller et al. ............. 417/549 |
| 6,161,466 A | * | 12/2000 | Schuller et al. .............. 91/422 |
| 6,171,083 B1 | * | 1/2001 | Schuller ...................... 417/549 |
| 6,217,300 B1 | * | 4/2001 | Schuller et al. ............. 417/549 |
| 6,224,352 B1 | * | 5/2001 | Hauser et al. ............... 417/313 |
| 6,276,909 B1 | * | 8/2001 | Siegel et al. ................. 417/549 |
| 6,302,663 B1 | * | 10/2001 | Schuller et al. ............. 417/554 |
| 6,648,614 B1 | * | 11/2003 | Hinz et al. ................... 417/470 |
| 6,652,245 B2 | * | 11/2003 | Hauser et al. ............... 417/313 |

(Continued)

FOREIGN PATENT DOCUMENTS

DE        382 8274 A1      3/1989

(Continued)

*Primary Examiner*—Devon C Kramer
*Assistant Examiner*—Vikansha S Dwivedi
(74) *Attorney, Agent, or Firm*—RatnerPrestia

(57) ABSTRACT

The invention relates to a supply device for the supply of pressure fluid into at least one vehicle brake, into a pressure fluid reservoir or into a pressure fluid accumulator, with a pressure fluid inlet and a pressure fluid outlet as well as with the following features: a piston is movably arranged in an accommodating member and has at least two hydraulically active diameters for the supply in the direction of the pressure fluid outlet, at least one non-return valve is used for the ventilation of a working chamber into which the piston is immersed. It is the essence of the invention that the piston has a multi-part design and comprises at least two synchronously movable partial pistons, with the first partial piston exhibiting the first hydraulically active diameter, and the second partial piston exhibiting the second hydraulically active diameter.

10 Claims, 5 Drawing Sheets

U.S. PATENT DOCUMENTS

2001/0016171 A1 * 8/2001 Schuller et al. ............. 417/545
2001/0048884 A1 * 12/2001 Siegel et al. ................ 417/470
2002/0155008 A1 * 10/2002 Hauser et al. ............... 417/313

FOREIGN PATENT DOCUMENTS

| | | |
|---|---|---|
| DE | 40 15 786 A1 | 11/1990 |
| DE | 197 43 747 A1 | 1/1999 |
| DE | 198 47 471 A1 | 12/1999 |
| DE | 100 25 424 A1 | 2/2001 |
| DE | 100 13 269 A1 | 9/2001 |
| GB | 2 011 996 A | 7/1979 |
| WO | WO 99/06697 | 2/1999 |
| WO | WO 99/06702 | 2/1999 |
| WO | WO 99/06703 | 2/1999 |
| WO | WO 00/06905 | 2/2000 |

* cited by examiner

CONVEYOR DEVICE

TECHNICAL FIELD

The present invention relates to a supply device for the supply of pressure fluid into at least one vehicle brake, with a pressure fluid inlet and a pressure fluid outlet as well as a piston, which is movably arranged in an accommodating member and has at least two hydraulically active diameters for the supply in the direction of the pressure fluid outlet, wherein at least one non-return valve is used for the ventilation of a working chamber into which the piston is immersed.

BACKGROUND OF THE INVENTION

A supply device of the type of a stepped-piston pump is principally known in the art and illustrated in FIG. 1. An object of the invention is to provide a supply device that is wear-resistant and improved in terms of manufacturing costs and mounting space requirement.

BRIEF SUMMARY OF THE INVENTION

This object is achieved because the piston has a multi-part design and comprises at least two synchronously movable partial pistons, with the first partial piston exhibiting the first hydraulically active diameter, and the second partial piston exhibiting the second hydraulically active diameter. This type of construction allows reducing the demands placed on the concentricity of the bore (pump bore) in the accommodating member. A higher rate of flexibility is possible with respect to the variation of the type of construction of partial pistons and non-return valves. The result is that different embodiments of partial pistons and non-return valves can be combined in a modular system with little expenditure. Transverse forces at the piston and, hence, piston wear is reduced due to the mechanical decoupling of the areas with different diameters.

For a further reduction in costs, the invention allows the use of finished rolling bearing needles in the capacity of a first partial piston. The second partial piston is preferably provided as a metal worked part shaped in non cutting forming or as a molded plastic part. Even if the second partial piston is designed as a turned part, the manufacturing extent at the plant of the manufacturer of the supply device is reduced due to reduced machining operations.

The number of the necessary components is reduced in another embodiment of the invention when the first partial piston and the second partial piston are arranged and guided so as to be movable directly in the accommodating member.

To reduce the leakage, it is advantageous according to an embodiment of the invention when a sealing element is associated in each case with the first and the second partial piston for sealing the working chamber.

It is particularly favorable when the second partial piston includes a sealing seat for a valve member of the non-return valve. The mounting space requirement is reduced especially in the axial direction when the non-return valve is integrated into the second partial piston.

If the accommodating member is made of a material of low wear resistance, and in order to guide the second piston part quasi in a type of bushing, the non-return valve can be configured as a suction valve. There is provision of another non-return valve designed as a pressure valve and having a sealing seat provided at a base member that includes a casing in which the second partial piston is received.

When the surface of the casing has a stop at its end, said stop can be used to secure the sealing element in an accommodating bore of the accommodating member.

Low-cost manufacture is additionally achieved when the second partial piston is designed as a ball and when the ball is arranged and guided in a casing of a base member for a non-return valve. For reducing the manufacturing extent, the ball can be a purchased rolling bearing ball.

The effort and structure needed for manufacturing the non-return valve is reduced when it is designed integrally as a sleeve-type non-return valve.

DETAILED DESCRIPTION OF THE PREFERRED EMBODIMENT

Figure 1:
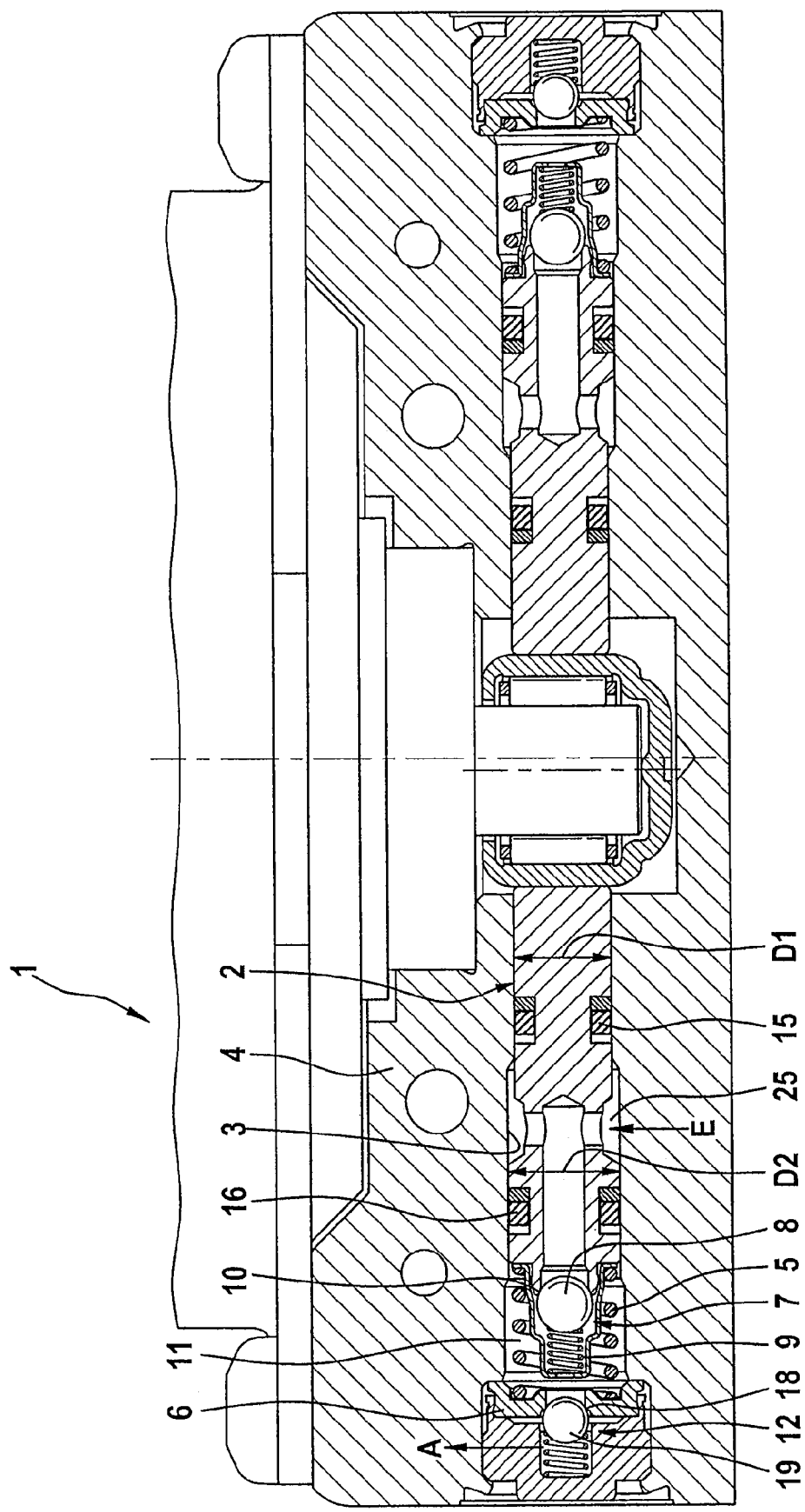
FIG. 1 is a cross-sectional view of a prior art supply device.

FIG. 1 shows a supply device 1 having a one-part piston 2 that is arranged and guided so as to be movable in a bore 3 of an accommodating member 4, which latter is a component of an electrohydraulic assembly equipped with an electronic control unit (ECU) for use in a motor vehicle brake system in particular. The accommodating member 4 includes non-illustrated, electromagnetically actuatable valves and channels interconnecting the valves and allowing the supply of pressure fluid out of a schematically sketched inlet (E) to an outlet (A), more specifically, from a working chamber 11 into a non-illustrated pressure fluid accumulator or into non-illustrated vehicle brakes or a pressure fluid reservoir, respectively, for the purpose of a controlled pressure increase. This arrangement enables braking of the vehicle or a control intervention such as a driving stability control intervention (ESP) or any other control intervention such as slip control in particular.

In order to improve the filling ratio in the working chamber 11, the pump has a pre-charging mechanism because the piston 2 has a stepped design and disposes of two separable, differently large hydraulically active diameters D1, D2. The smaller hydraulic diameter D1 along with a supply chamber 25 provided in the accommodating member 4 causes a charging effect for the working chamber 11 because the pressure fluid volume available in the supply chamber 25 eliminates the effect of restricted suction as occurring in simple piston pumps without steps. The piston 2 with one end abuts indirectly by way of a roller bearing on a driving eccentric, which is set rotating by means of a shaft of an electric motor not shown. A resetting spring 5 is inserted between a carrier 6 for a non-return valve 12 and the piston 2 and ensures a permanently active resetting force.

As can be taken from FIG. 1, a non-return valve 7 configured as a suction valve is provided between supply chamber 25 and working chamber 11. Further, a non-return valve 12 configured as a pressure valve is used for the ventilation of the working chamber 11. For this purpose, a valve member 8 of the non-return valve 7 is pressed by a spring 9 to permanently adopt a closing position for abutment on a piston-side sealing seat 10. Only during a suction stroke of the piston 2 will the pressure difference applied to the valve member 8 overcome the active spring force so that the valve member 8 moves into the non-illustrated opening position for the ventilation of the working chamber 11, with the result that the inlet of pressure fluid into the working chamber 11 takes place. The pressure fluid inlet is closed during the pressure stroke, and the pressure fluid propagates to the mentioned consumer through the non-return valve 12 that opens when subjected to pressure.

Figure 2:
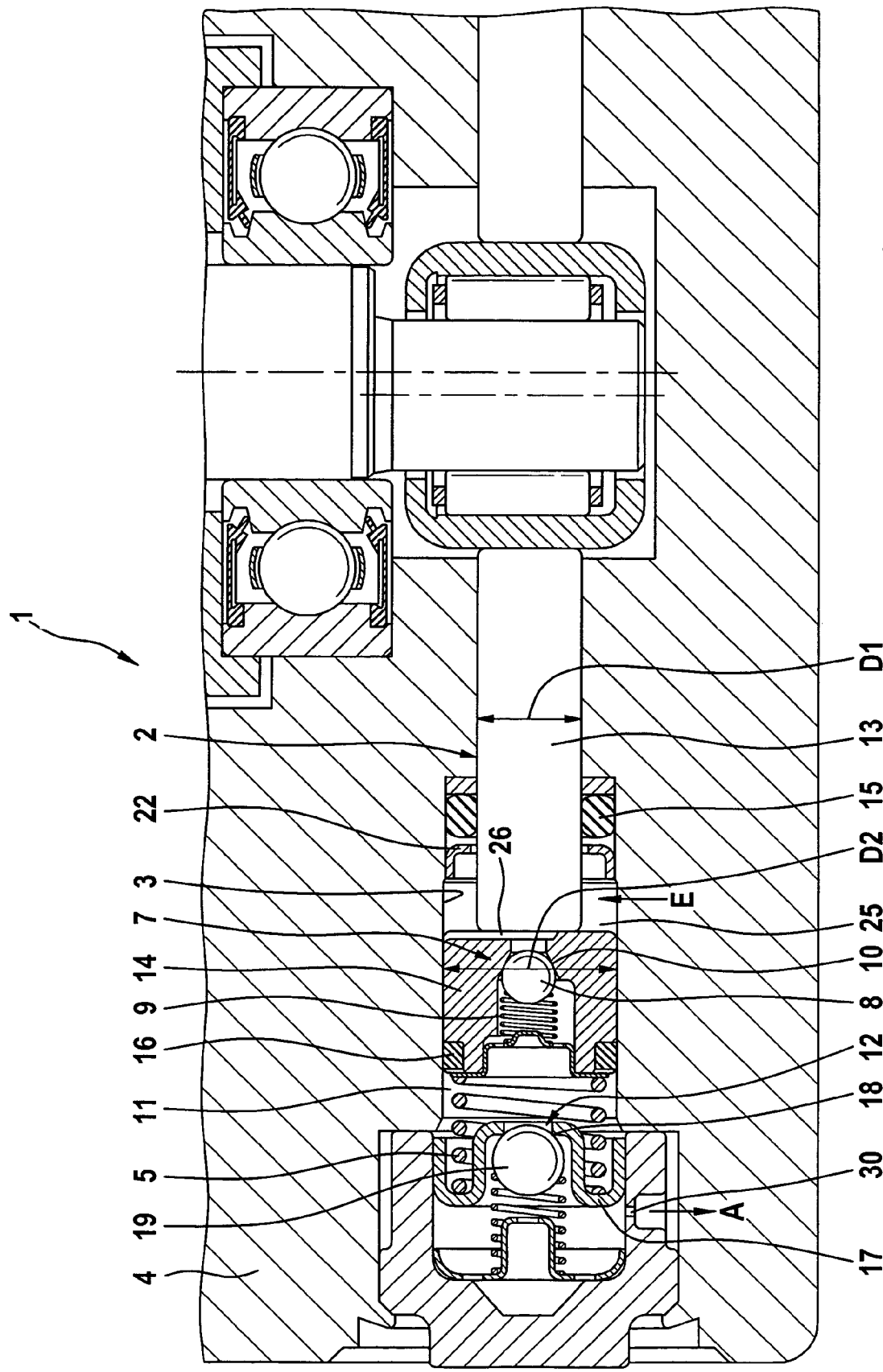
FIG. 2 is a cross-sectional view of a first embodiment of the invention.

Referring to FIG. 2, the differences will be dealt with in the following. Features corresponding to each other have been assigned like reference numerals. According to FIG. 2, the piston 2 has a multi-part design and comprises a first and a second partial piston 13, 14 which are synchronously movable with each other, are in direct abutment on each other and have a channel 26 in their abutment surface which connects the supply chamber 25 and the working chamber 11. Both partial pistons 13, 14 are movably received directly in the bore 3 of the accommodating member 4, and sealing elements 15, 16 are used to seal the working chamber 11 and the supply chamber 25. The first partial piston 13 comprises a rolling bearing needle that is preferably left in the condition at time of supply so that no machining, in particular no metal-cutting operation is required. The second partial piston 14 is preferably a non-cutting shaped metal worked part or a molded plastic part. As shown in FIG. 2, the non-return valve 7 is integrated into the second piston part 14. Beside the non-return valve 7, another non-return valve 12, configured as a pressure valve, is provided in the supply direction and spaced axially from the partial piston 14, said non-return valve having a base member 17 and an integrated throttle bore 30 acting in the direction of outlet A.

Figure 3:
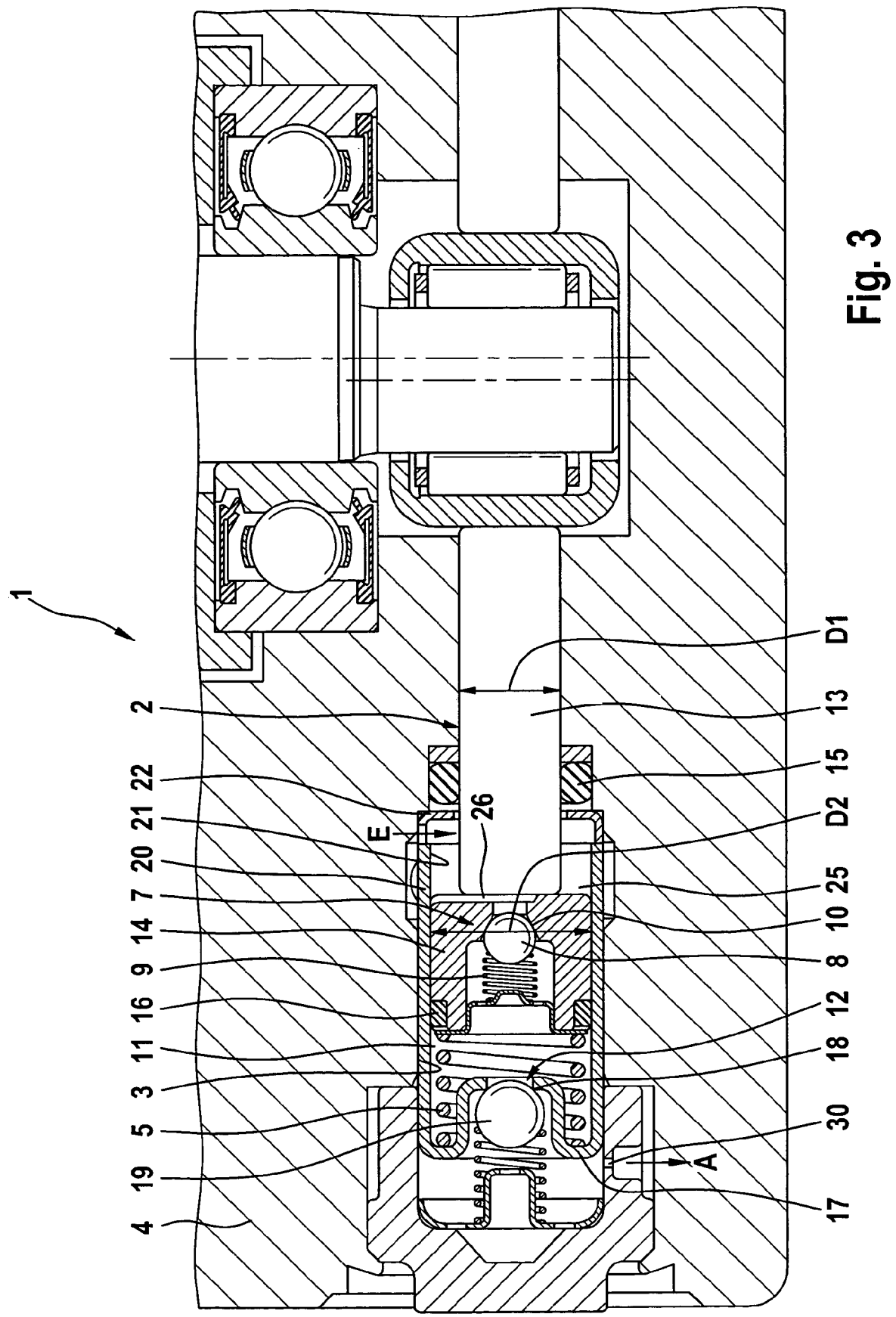
FIG. 3 is a cross-sectional view of a second embodiment of the invention.

The embodiment according to FIG. 3 differs from FIG. 2 because the other pressure valve 12 includes a base member 17 with a sealing seat 18 for an elastically biased closure member 19 and a casing 20, which accommodates the second partial piston 14 in its interior. Because the partial piston 14 abuts on an inside wall 21 of the casing 20, the latter is quasi used as a bushing for the second partial piston 14. When the base member 4 is made of a material of low wear resistance, this allows improving the wear resistance, provided a corresponding wearing quality of casing 20. Casing 20 includes at its end an integrally shaped stop 22 bent at right angles in a radially inward direction for securing the sealing element 15 in position in the bore 3 of the accommodating member 4.

Figure 4:
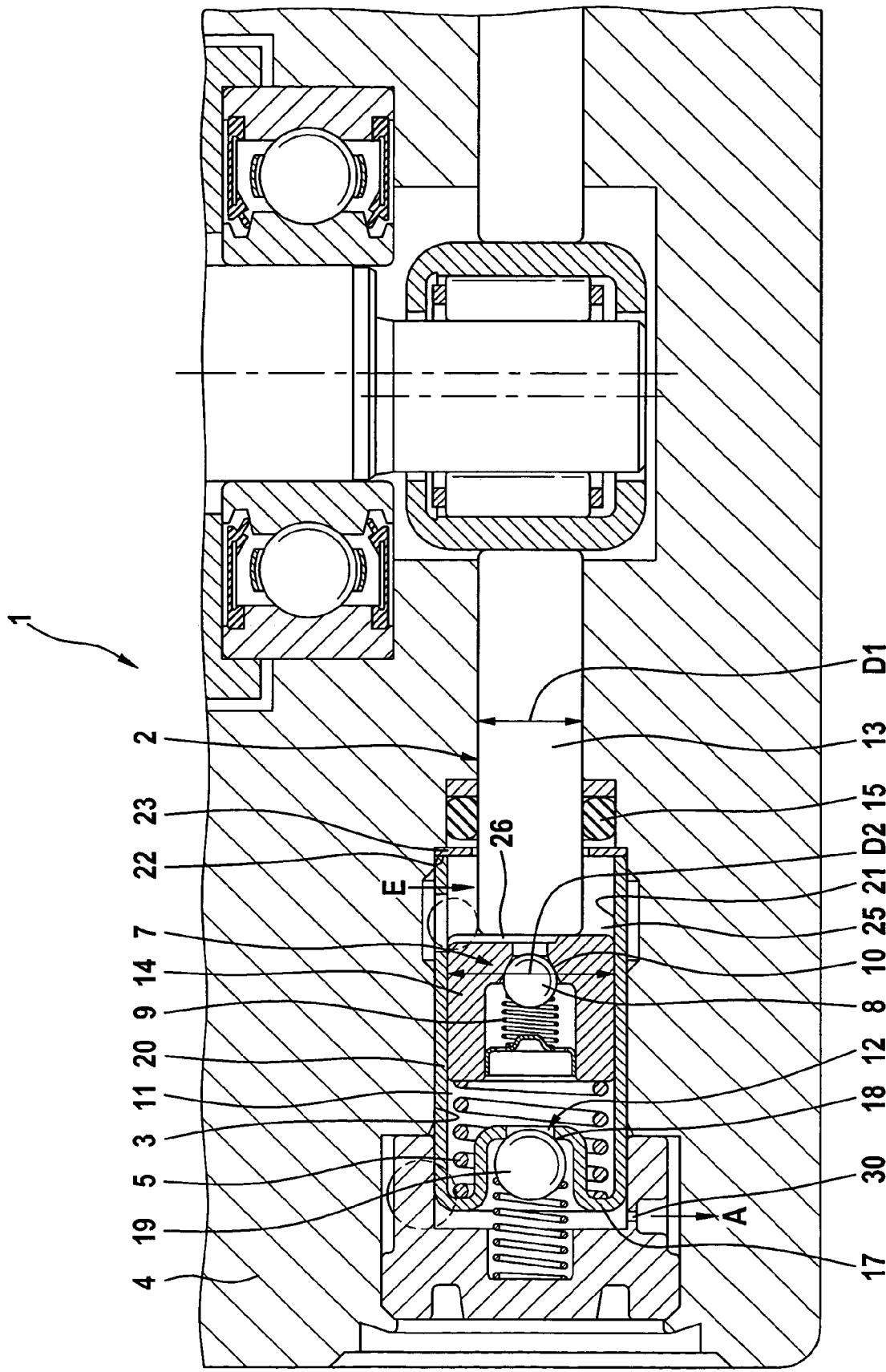
FIG. 4 is a cross-sectional view of a third embodiment of the invention.

FIG. 4 differs from FIG. 3 in that the sealing element 16 at the second partial piston 14 was omitted so that the partial piston 14 moves directly within the inside wall 21 of the casing 20. Further, the non-return valve 12 does not have a spring guide, which is in contrast to FIGS. 2 and 3. A separate disc 23, which bears against a frontal end of casing 20, is used to secure the position of the sealing element 15.

Figure 5:
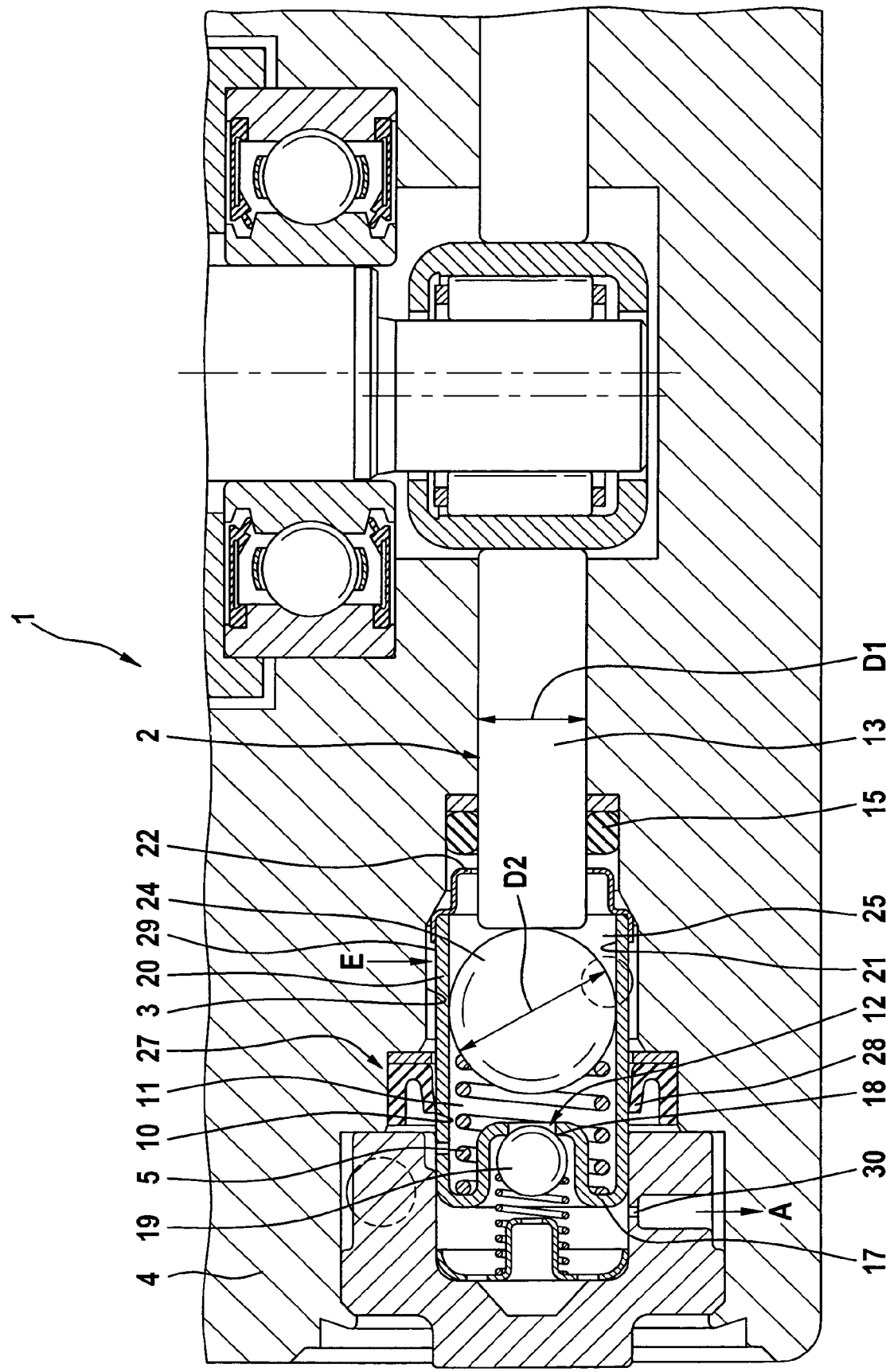
FIG. 5 is a cross-sectional view of a fourth embodiment of the invention.

FIG. 5 displays an embodiment in which the second partial piston 24 is configured as a ball. Said ball is preferably a rolling bearing ball. The thus formed partial piston 24 moves, as is illustrated in FIG. 4, directly on the inside wall 21 of the casing 20 that starts from the base member 17. A resetting spring 5 is provided and biased between the base member 17 and the ball. At the other, principally open end, the casing 20 is closed in such a fashion that the ball remains within the casing 20 so that a pre-assembled unit is composed of base member 17, resetting spring 5, and partial piston 24. In this embodiment of the invention, the non-return valve 27 (suction valve) is provided as an integral sleeve-type non-return valve whose (dynamic) sealing lip 28, that opens or closes in response to the differential pressure, abuts on an outside wall 29 of the casing 20.

LIST OF REFERENCE NUMERALS 1 supply device
2 piston
3 bore
4 accommodating
5 resetting spring
6 carrier
7 non-return valve
8 valve member
9 spring
10 sealing seat
11 working chamber
12 non-return valve
13 partial piston
14 partial piston
15 sealing element
16 sealing element
17 base member
18 sealing seat
19 closure member
20 periphery
21 inside wall
22 stop
23 disc
24 partial piston
25 supply chamber
26 channel
27 non-return valve
28 sealing lip
29 outside wall
30 throttle bore
E inlet
A outlet
D1 diameter
D2 diameter

The invention claimed is:

1. A supply device configured to supply pressure fluid into at least one vehicle brake, said supply device comprising:
   a pressure fluid inlet,
   a pressure fluid outlet,
   a piston is movably arranged in a bore of an accommodating member and has at least two hydraulically active diameters to supply pressure fluid in a direction of the pressure fluid outlet,
   at least one non-return valve is used for ventilation of a working chamber into which the piston is immersed,
   wherein the piston has a multi-part design and comprises at least two synchronously movable partial pistons, with a first partial piston exhibiting a first hydraulically active diameter, and a second partial piston exhibiting a second hydraulically active diameter, the first hydraulically active diameter of the first partial piston defining a pre-charging mechanism,
   wherein the first partial piston is defined by a cylindrical body of substantially constant diameter and the second partial piston includes a sealing seat for a valve member of the at least one non-return valve.

2. The supply device as claimed in claim 1,
   wherein the first partial piston is provided as a rolling bearing needle, and in that the second partial piston is provided as a metal part.

3. The supply device as claimed in claim 1,
   wherein the second partial piston is provided as a molded plastic part.

4. A supply device configured to supply pressure fluid into at least one vehicle brake, said supply device comprising:

a pressure fluid inlet, a pressure fluid outlet, a piston is movably arranged in a bore of an accommodating member and has a first partial piston defining a first hydraulically active diameters and a second partial piston defining a second hydraulically active diameter to supply pressure fluid in a direction of the pressure fluid outlet, at least one non-return valve is used for ventilation of a working chamber into which the piston is immersed, wherein the first partial piston and the second partial piston are arranged and guided so as to be movable directly in the bore of the accommodating member.

5. The supply device as claimed in claim 4, wherein a sealing element is associated in each case with the first and the second partial piston and directly engages the bore of the accommodating member for sealing the working chamber.

6. The supply device as claimed in claim 4, wherein the non-return valve is integrated into the second partial piston.

7. The supply device as claimed in claim 4, wherein the non-return valve is configured as a suction valve, and in that another non-return valve designed as a pressure valve is provided, having a sealing seat provided at a base member that includes a casing in which the second partial piston is received.

8. A supply device configured to supply pressure fluid into at least one vehicle brake, said supply device comprising:

a pressure fluid inlet, a pressure fluid outlet, a piston is movably arranged in a bore of an accommodating member and has a first partial piston defining a first hydraulically active diameter and a second partial piston defining a second hydraulically active diameter to supply pressure fluid in a direction of the pressure fluid outlet, at least one non-return valve is used for ventilation of a working chamber into which the piston is immersed, the non-return valve is configured as a suction valve, and a second non-return valve designed as a pressure valve and having a sealing seat provided at a base member that includes a casing in which the second partial piston is received, wherein the casing defines a shoulder at a top end thereof, said shoulder radially extending between the hydraulically active diameters for securing a sealing element engaging the first partial piston in position in the bore of the accommodating member.

9. A supply device configured to supply pressure fluid into at least one vehicle brake, said supply device comprising:

a pressure fluid inlet, a pressure fluid outlet, a piston is movably arranged in a bore of an accommodating member and has a first partial piston defining a first hydraulically active diameter and a second partial piston defining a second hydraulically active diameter larger than the first hydraulically active diameter to supply pressure fluid in a direction of the pressure fluid outlet, at least one non-return valve is used for ventilation of a working chamber into which the piston is immersed, wherein the second partial piston is a ball arranged and guided in a casing of a base member for a second non-return valve.

10. The supply device as claimed in claim 9, wherein the non-return valve is designed as an integral sleeve-type non-return valve.

* * * * *